Sept. 27, 1966   H. C. LIEN   3,274,641
APPARATUS AND METHOD FOR MAKING CRUTCH PADS
Filed Feb. 28, 1963
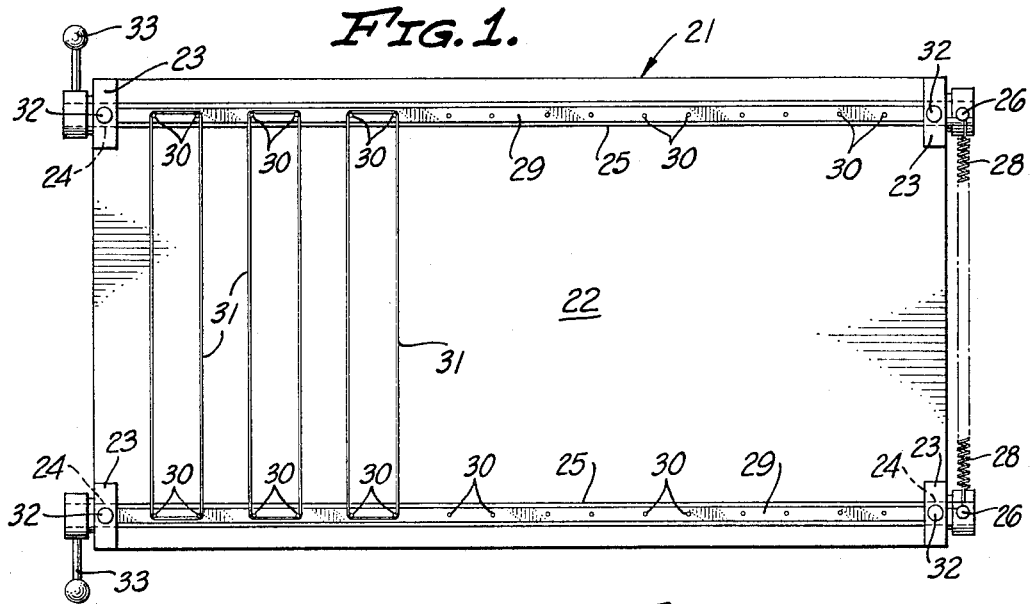
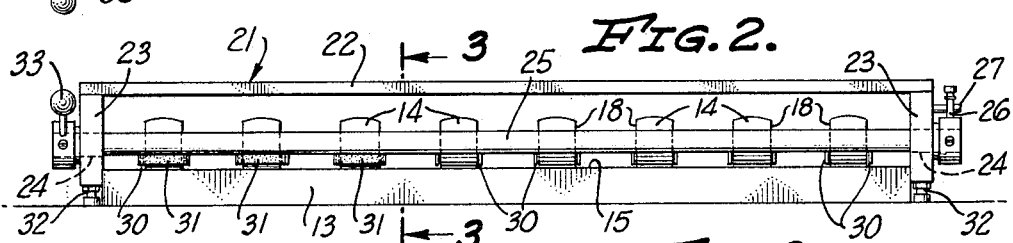
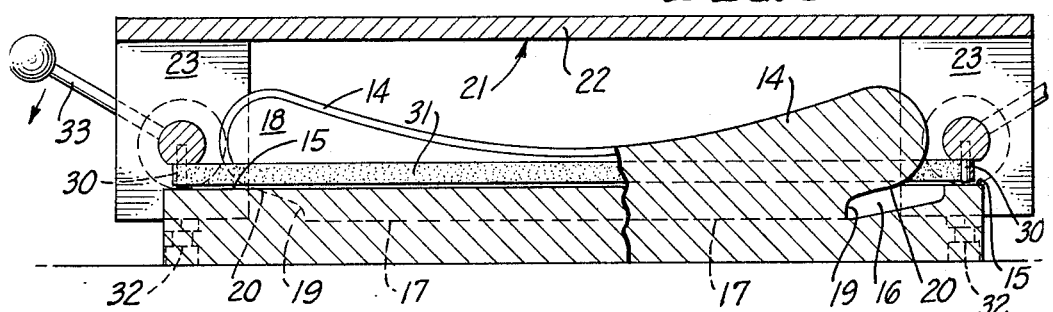
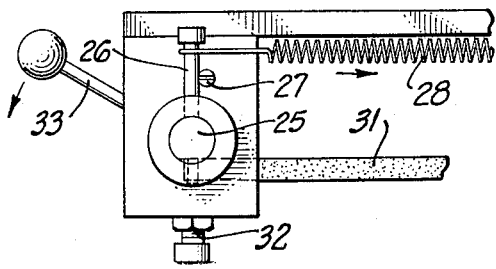
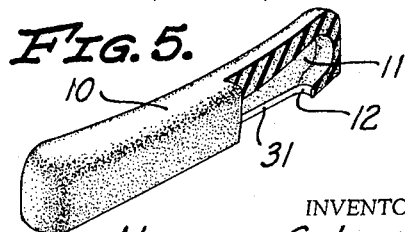
INVENTOR.
HOWARD C. LIEN
BY Robert C. Comstock
ATTORNEY

United States Patent Office 3,274,641
Patented Sept. 27, 1966

3,274,641
APPARATUS AND METHOD FOR MAKING
CRUTCH PADS
Howard C. Lien, Los Angeles, Calif., assignor to Alfred A.
Smith, North Hollywood, Calif.
Filed Feb. 28, 1963, Ser. No. 261,798
10 Claims. (Cl. 18—1)

This invention relates to an apparatus and method for making crutch pads.

The crutch pads to which this invention relates are composed of an elastomer, commonly sponge rubber or the like, and are formed in molds, each cavity of the mold forming a complete unitary crutch pad. The pad is somewhat elastic and is provided with a hollow interior and an opening for mounting the pad more or less permanently on the armpiece of a crutch.

It has been found that the portion of the pad which surrounds the crutch receiving opening is subjected to constant tension and is accordingly the place where the pad is likely to fail first. It has accordingly been found desirable to reinforce this portion of the pad by providing the pad with a band or similar reinforcing member formed of stronger material than the body portion of the pad. This reinforcing member surrounds all or part of the crutch receiving opening.

It is desirable that this band or other reinforcing member be formed integrally with the body portion of the pad and preferably during the same molding operation. This results in more economical manufacture and in the formation of a better bond between the body portion of the pad and the reinforcing member.

A difficult problem is presented, however, by the fact that crutch pads are customarily formed in multiple cavity molds which are heated to temperatures in the range of 300° F. during the molding operation. The problem is to place the reinforcing members properly within the molds as quickly as possible without harm to the operator and without allowing the molds to cool excessively.

It is accordingly the principal object of this invention to provide an apparatus and method which are adapted to simultaneously mount a plurality of reinforcing members on the male mandrels of the molds. The apparatus and method of the present invention also permit pre-loading of the reinforcing members on the apparatus so that the open time of the molds is held to a minimum.

It is among the further objects of the invention to provide such a device and method which are simple and substantially fool-proof, which will not damage the molds and which will result in substantial economies in the manufacture of crutch pads of the type described.

The present invention also contemplates such other objects, advantages and capabilities as will later more fully appear and which are inherently possessed by the invention.

While there has been shown in the accompanying drawings a preferred embodiment of the invention, it should be understood that the same is susceptible of modification and change without departing from the spirit of the invention.

Referring to the drawings,

FIG. 1 is a bottom plan view of the loading device with three reinforcing bands mounted thereon;

FIG. 2 is a side elevational view of the loading device in use on an eight mandrel mold, with only three reinforcing bands mounted thereon;

FIG. 3 is a sectional view of the same, taken along line 3—3 of FIG. 2, with a portion thereof shown in elevation;

FIG. 4 is an elevational view of a portion of one end of the loading device;

FIG. 5 is an isometric view, partly broken away and shown in section, of the completed pad.

A crutch pad of the type which is formed with the present invention customarily comprises a somewhat soft or cushion-like body portion 10, which may be formed of any suitable cellular or non-cellular elastomer. The body portion 10 has a hollow interior 11 and an elongated longitudinally directed downwardly facing opening 12 which is slightly smaller than the hollow interior 11 and which is capable of being stretched to fit the pad on the armpiece of a crutch.

The body portion 10 is customarily formed in a two-part mold comprising a male part 13 and a complementarily formed female part which is not shown in the drawings. The male part 13 is provided with a mandrel 14, which follows the contour of the armpiece of a crutch, so that the shape of the interior 11 of the pad substantially corresponds to that of the crutch armpiece. The male part 13 is provided with a flat portion 15, which fits tightly against a corresponding flat portion on the female mold to define the parting line of the mold.

The male part 13 is provided with a recessed portion 16, which surrounds the mandrel 14. The bottom of the recessed portion 16 (when the male part 13 is in the position shown in the drawings) extends in a straight line 17 along both sides of the mandrel 14. The mandrel 14 is provided with a pair of straight sides 18. Both ends of the mandrel 14 are provided with vertical portions 19, which are slightly curved and which extend in a generally vertical direction, above which are horizontal portions 20 which are conversely curved and which extend in a generally horizontal direction. When considered with reference to the flat portion 15, the horizontal portions 20 may be considered to define a convex curve extending inwardly and downwardly from the flat portion 15 to the vertical portions 19.

The loading device 21 which is adapted to be used with the male part 13 comprises a rectangular plate 22, which is slightly larger than the male part 13. The loading device is placed for loading purposes on a flat surface in the position shown in FIG. 1 of the drawings. Attached to the four corners of the plate 22 are four corner members 23. Each of the corner members 23 comprises a substantially square flat member which is secured along one edge to the plate 22 directly adjacent to one end of the plate 22.

The four corner members 23 are provided with central openings 24, through which extend the opposite ends of a pair of rods 25. The rods 25 extend parallel to the sides of the plate 22 and are spaced slightly inwardly therefrom. The rods 25 are rotatably journaled in the openings 24 of the corner members 23.

As best shown in FIG. 4 of the drawings, a stop number 26 is attached to one end of each of the rods 25 on the outside of the corner member 23. Each of the stop members 26 is adapted to engage a stop pin 27 which extends outwardly from the outside face of the corner member 23 adjacent to the opening 24. An elongated coil spring 28 is connected at its opposite ends to the stop members 26 and acts to urge the stop members 26 into engagement with the stop pins 27 to limit the rotation of the rods 25 and define their normal rotational positions.

Attached to the opposite end of each of the rods 25 is a control lever 33. Movement of either of the control levers 33 results in rotation of the rod 25 to which it is attached against the urging of the coil spring 28 to rotate the stop member 26 away from the stop pin 27. In the embodiment shown, the control levers 33 can be operated and the rods 25 rotated either simultaneously or independently from each other. The rods 25 may be connected together for simultaneous rotational movement through a single control lever if desired.

Whenever one or both of the control levers 33 is operated, the coil spring 28 acts to return the rod 25 to its normal rotational position by urging the stop member 26 back into engagement with the stop pin 27.

Each of the rods 25 is provided with a flat side 29 along its upper surface as shown in FIG. 1 of the drawings. Extending vertically upwardly from the flat sides 29 are a plurality of spaced pins 30, which are arranged in pairs. Each pair of pins 30 is spaced apart a distance slightly greater than the width of the mandrel 14. The distance between the rods 25 is also slightly greater than the length of the mandrel 14.

The spacing and alignment of the pins 30 corresponds to the spacing and alignment of the mandrels 14 on the male part 13. In the embodiment shown in the drawings, the rods 25 carry eight sets of pins 30, each set comprising four pins (two on each rod) which define an elongated rectangle slightly larger in dimensions than the mandrel 14.

The loading device 21 is loaded by mounting on each of said eight sets of pins 30 an elongated elastic band 31, which may be formed of any suitable elastomer and which preferably has greater tensile strength than the material forming the body portion 10 of the pad. The band 31 should preferably be so formed and dimensioned that it must be stretched to fit around the set of pins 30 and so that it will retain itself in position on the pins 30 and subsequently on the mandrel 14 by means of its own elasticity. Three of the bands 31 are shown in position on the pins 30 in the drawings, for purposes of illustration. In use, all eight bands would be mounted on the pins 30.

After the eight bands have been mounted on the pins 30, the loading device 21 is inverted and placed over the male part 13. The corner members 23 are preferably dimensioned so that they fit against the outside surfaces of the ends of the male part 13 to position the loading device 21 with respect to the male part 13.

The corner members 23 are preferably provided with feet 32, which are adjustable in length and which are adapted to engage the surface upon which the male part 13 is mounted. The feet 32 hold the loading device 21 above the male part 13 so that the ends of the pins 30 are disposed a slight distance above the flat portion 15 of the male part 13. It is preferable that the pins 30 should not engage the flat portion 15, since wear may be caused by such repeated engagement.

When the loading device is mounted over the male part 13 as shown in FIGS. 2 and 3 of the drawings, the bands 31 are held in positions surrounding the mandrels 14. When the control levers 33 are rotated, the rods 25 rotate, causing the pins 30 to be rotated inwardly toward the mandrels 14. As the pins 30 approach a horizontal position, the bands 31 are released and freed to pull off the pins 30 due to their own elasticity. Upon their release, the bands 31 move into engagement with the horizontal portions 20 of the ends of the mandrels 14 and then slide inwardly and downwardly along the horizontal portions 20 until they fit over the vertical portions 19.

The bands 31 there reach a stable position in which they fit and are held by their own elasticity around the bottom or base portion of each of the mandrels 14. The bands 31 fit against the straight sides 18 of the mandrels 14, with their lower edges extending along the straight line 17 adjacent the base of the mandrels 14. The body portion 10 of the pad is then molded in any desired manner and the bands 31 become bonded to the body portions 10 of the pads during the molding operation. In the completed pads, the bands 31 preferably extend circumferentially around and directly adjacent to the inner edge of the crutch receiving opening 12.

The bands 31 can be loaded on the pins 30 during the time that a set of pads is being molded. Upon completion of the molding, the pads are stripped from the molds and the male part 13 placed on a flat surface with the mandrels 14 directed upwardly. The loading device 21, which has been fully loaded, is placed above the male part 13 in such position that the bands 31 surround the mandrels 14. The control levers 33 are then operated to free the bands 31 and transfer them by means of their own elasticity to the desired positions surrounding the base portions of the mandrels 14. The loading of a large number of bands 31 can thus be accomplished in a matter of seconds without risk of injury to the operator and without excessive cooling of the molds.

While an eight mandrel mold has been selected for purposes of illustration, it will be recognized that the invention is capable of use with molds having any number of mandrels.

I claim:

1. In combination with a male mold part for forming molded crutch pads of the type having a crutch receiving opening with an elastic reinforcing member disposed adjacent to said opening, said mold part having a plurality of mandrels, a loading device for simultaneously mounting a plurality of said elastic reinforcing members on said mandrels prior to the molding of said pads, said loading device having a pair of elongated rotatable rods, a plurality of pairs of pins carried by each of said rods, said pins being arranged to form a plurality of sets of four pins each, two on each of said rods, each of said sets of pins being adapted to removably hold one of said bands, each of said sets of pins being slightly larger in width and length than one of said mandrels, said sets of pins being aligned similarly to said mandrels, said loading device adapted to be disposed adjacent to said male mold part so that each of said bands surrounds one of said mandrels, and means for rotating said rods to rotate said pins toward said mandrels and release said bands from said pins, said bands being adapted to contract due to their own elasticity into engagement with said mandrels.

2. In combination with a male mold part for forming molded crutch pads of the type having a crutch receiving opening with an elastic reinforcing member disposed adjacent to said opening, said mold part having a plurality of mandrels, a loading device for simultaneously mounting a plurality of said elastic reinforcing members on said mandrels prior to the molding of said pads, said loading device having a plurality of sets of holding means, each of said sets being adapted to removably hold one of said bands, each of said sets being slightly larger in width and length than one of said mandrels, said sets being aligned similarly to said mandrels, said loading device adapted to be disposed adjacent to said male mold part so that each of said bands surrounds one of said mandrels, and means for releasing said bands from said holding means into engagement with said mandrels.

3. The structure described in claim 2, each of said mandrels having a base portion disposed a substantial distance from said bands when said bands are in their release positions, each end of said mandrels being slanted toward the base portion thereof so that said bands upon release are adapted to move along the ends of said mandrels to the base portions of said mandrels.

4. In combination with a male mold part for forming molded crutch pads of the type having a crutch receiving opening with an elastic reinforcing member disposed adjacent to said opening, said mold part having at least one mandrel, a loading device for mounting one of said reinforcing members on each mandrel prior to the molding of said pads, said loading device having at least one holding means, said holding means being adapted to removably hold at least one of said bands, said holding means being slightly larger in width and length than one of said mandrels, said loading device adapted to be disposed adjacent to said mold part so that the band mounted on each of said holding means surrounds one of said mandrels, and means for releasing said band from said holding means into engagement with said mandrel.

5. In an apparatus for making molded crutch pads of the type having a crutch receiving opening with an elastic reinforcing band disposed adjacent to said opening, said pad being formed on a mandrel, a loading device having holding means slightly larger than said mandrel, said band adapted to be mounted on said holding means, said loading device adapted to be disposed adjacent to said mandrel so that said band substantially surrounds said mandrel, and means for releasing said band from said holding means into engagement with said mandrel.

6. In a method of making molded crutch pads of the type having a crutch receiving opening with an elastic reinforcing band disposed adjacent to said opening, said pads being formed on molds having a plurality of mandrels, mounting a plurality of said elastic bands on a loading device, said loading device having a pair of rotatable rods, each of said rods carrying a plurality of pins, said pins being arranged in sets, each of said sets of pins being of somewhat greater dimensions than one of said mandrels, one of said bands being mounted on each of said sets of pins, placing said loading device adjacent to said mandrels so that said bands substantially surround said mandrels, and rotating said rods to release said bands from said pins, said bands contracting due to their own elasticity into engagement with said mandrels.

7. In a method of making molded crutch pads of the type having a crutch receiving opening with an elastic reinforcing band disposed adjacent to said opening, said pads being formed on molds having a plurality of mandrels, mounting a plurality of said elastic bands on a loading device, said loading device having a plurality of holding means, each of said holding means being of somewhat greater dimensions than one of said mandrels, placing said holding means adjacent to said mandrels so that said bands substantially surround said mandrels, and releasing said bands from said holding means into engagement with said mandrels.

8. In a method of making molded crutch pads of the type having a crutch receiving opening with an elastic reinforcing band disposed adjacent to said opening, said pad being formed on a mandrel, providing a loading device having holding means slightly larger than said mandrel, mounting said band on said holding means, disposing said holding means adjacent to said mandrel so that said band substantially surrounds said mandrel and releasing said band from said holding means into engagement with said mandrel.

9. In a method of making molded crutch pads of the type having a crutch receiving opening with an elastic reinforcing band disposed adjacent to said opening, said pad being formed on a mandrel, providing a holding device having holding means, mounting said band on said holding means, disposing said holding means adjacent to said mandrel so that said band fits around at least a portion of said mandrel and releasing said band from said holding means into engagement with said mandrel.

10. In an apparatus for making molded crutch pads of the type having a crutch receiving opening with an elastic reinforcing band disposed adjacent to said opening, said pad being formed on a mandrel, a loading device having holding means, said band adapted to be removably mounted on said holding means, said loading device adapted to be disposed adjacent to said mandrel so that said band fits around at least a portion of said mandrel, and means for releasing said band from said holding means into engagement with said mandrel.

References Cited by the Examiner
UNITED STATES PATENTS

| | | | |
|---|---|---|---|
| 2,017,604 | 10/1935 | Mountford et al. | 264—229 |
| 2,283,238 | 5/1942 | Thompson | 264—229 |
| 2,786,235 | 3/1957 | Schuferstein | 264—229 |

WILLIAM J. STEPHENSON, *Primary Examiner.*